Sept. 20, 1960 R. L. WILSON 2,953,694
PULSE DISTRIBUTING ARRANGEMENTS
Filed Dec. 24, 1957 3 Sheets-Sheet 1

INVENTOR
R. L. WILSON
BY W. L. Keefauver
ATTORNEY

PULSE DISTRIBUTING ARRANGEMENTS

Filed Dec. 24, 1957

3 Sheets-Sheet 2

INVENTOR
R. L. WILSON
BY W. L. Keefauver
ATTORNEY

INVENTOR
R. L. WILSON
BY W. L. Keefauver
ATTORNEY

United States Patent Office 2,953,694

Patented Sept. 20, 1960

2,953,694

PULSE DISTRIBUTING ARRANGEMENTS

Robert L. Wilson, West Millington, N.J., assignor to Bell Telephone Laboratories, Incorporated, New York, N.Y., a corporation of New York Filed Dec. 24, 1957, Ser. No. 704,928

8 Claims. (Cl. 307—88.5)

This invention relates to pulse distributing arrangements and, in particular, to pulse distributing arrangements for supplying trains of timing pulses.

The transmission of messages by pulse code modulation (PCM) techniques is described in the prior art. Basically, the transmission of a message by PCM involves the steps of periodically sampling a message, translating the samples into pulse code groups and transmitting the pulse code groups to a receiver where they are translated back into the original message. The pulse code groups may comprise pulses and spaces which represent digits of a number system and occupy significant positions, sometimes referred to as time slots, in the groups. Furthermore, it is known that a plurality of messages in PCM form are easily transmitted over a common medium through the use of time division multiplexing techniques. Time division multiplexing is performed at the transmitter by sequentially assigning a common transmission medium to a plurality of input channels so that pulse coded samples of the messages are transmitted in an interlaced manner. Trains of pulses are used for timing both the sampling and encoding of the messages and the sequential assigning of the common transmission medium to the input channels. These timing pulse trains are provided by pulse distributing arrangements.

It is necessary at the receiver of a multiplexing system for the transmitted messages to be distributed to a plurality of output channels. In order to distribute the messages properly, a PCM receiver must operate in phase or frame with its transmitter. To effect framing between a PCM transmitter and receiver, it is known to transmit, in addition to pulse coded samples, framing information in the form of additional digits. The additional digits are selected and utilized at the receiver to frame it with the transmitter.

Several methods are employed in the prior art to provide framing digits in the transmitted code groups of a PCM multiplexing system. One method utilizes a portion, generally comprising one time slot, of each of the encoded samples of one of the messages for inserting this additional information once during each frame or cycle of operation. Although framing is achieved, the time slot assigned for inserting the additional information results in degrading one of the received messages.

Another known method for providing framing information in a PCM multiplexing system introduces extra digits more than once during each frame or cycle of operation. In one time division multiplexing system, for example, single digits of an encoded sample from each of the messages are transmitted in a sequential manner so that a group of digits comprising one digit from each of the encoded samples is transmitted before the next succeeding digit of each of the encoded samples is sent. Framing information is provided by introducing an additional pulse before the transmission of each group of digits. A number of additional pulses equal to the number of digits in any one of the encoded samples must, therefore, be transmitted for each complete set of encoded samples. Although degradation of any particular one of the received messages does not occur in this arrangement, it has been found that the percentage of transmitting time used is more than the minimum necessary to insure adequate framing.

When framing digits are inserted in the transmitted information of the above-mentioned systems, and others found in the prior art, it has been found that certain characteristics of the timing pulse trains used in the systems result in degradation of transmitted information or excessive loss of transmission time. In particular, the timing pulse trains in each of these systems have a constant repetition rate and a constant phase or time displacement with respect to one another. Because the repetition rate and the time displacement of these pulse trains are constant, the number of methods by which framing digits may be included in the transmitted message information is limited.

A preferred method of including framing information is one which both retains all of the encoded information and utilizes a minimum amount of the transmitting time. Applicant has found that this may be accomplished by periodically time-displacing all of the pulse trains so that, in effect, the repetition rates of the pulse trains are momentarily decreased. By using a group of pulse trains that are periodically time-displaced, the sampling and encoding of messages may be periodically discontinued while framing information is inserted in the transmitted signals.

An object of the present invention is to generate timing pulse trains that are periodically time-displaced so that the repetition rates of the trains are, in effect, momentarily decreased.

This and other objects are attained in accordance with the invention in one of its forms by periodically displacing in time the appearance of pulses on the output leads of a pulse distributor. By periodically time-displacing the output pulse trains of a distributor, the repetition rates of the pulse trains are momentarily decreased. Furthermore, the present invention in one of its forms is controllable for producing different submultiples of a pulse train having a fixed repetition rate.

In one of its broad aspects, the invention takes the form of a pulse distributing arrangement comprising a distributor for producing a predetermined number of pulse trains during one condition of operation and at least one less pulse train during another condition of operation, and circuitry for controlling the condition of operation of the distributor. The distributor in either of its conditions of operation produces pulse trains which are progressively displaced with respect to one another by equal intervals and individually have a repetition rate of $n/p$, where $1/n$ is the interval the pulse trains are progressively displaced with respect to one another and $p$ is the number of pulse trains produced by the distributor when in either of its conditions of operation. A distributor that may be modified to have these characteristics is disclosed, for example, in application Serial No. 456,648, filed September 17, 1954 by H. A. Schneider, which issued as Patent No. 2,888,557, dated May 26, 1959. Basically, the distributor comprises an inhibitor circuit having a transmission input lead, an inhibit input lead and an output lead, a pulse generator connected to the transmission input lead of the inhibitor circuit, and a phase shifting means comprising a plurality of delay circuits connected in circuit between the output lead and the inhibit input lead of the inhibitor circuit. If the repetition rate of the generator is $n$, the total delays introduced by $k$ delay circuits are $1/n, 2/n, \ldots k/n$, respectively. $k+1$ separate pulse trains are obtained from the outputs of the inhibitor circuit and the delay circuits. These pulse trains are progressively displaced with respect to one another by a time interval of $1/n$, while the frequency of the pulses in the trains is $$\frac{n}{k+1}$$

When the final delay circuit is rendered inactive, in accordance with the principles of the present invention, $k$ pulse trains are produced which are progressively displaced with respect to one another by a time interval of $1/n$, while the repetition rate of the pulses in the trains is $n/k$.

An important embodiment of the pulse distributing arrangement, which is disclosed in a PCM system forming the principal subject matter of H. M. Jamison and R. L. Wilson application Serial No. 704,929 filed of even date herewith, utilizes a phase shifting device comprising a plurality of serially connected delay circuits, each producing a delay equal to $1/n$. The input to the phase shifting means is connected to the output of the inhibitor circuit and the outputs of the individual delay circuits are all connected to the inhibit input lead of the inhibitor circuit. For a number of delay circuits equal to $k$, a number of pulse trains equal to $k+1$ are obtained from the outputs of the inhibitor circuit and the delay circuits. As described above, cutting out the final delay circuit reduces the number of pulse trains by one to $k$.

In a number of embodiments of the present invention, the pulse distributing arrangement includes a blocking oscillator type of pulse generator having an input terminal which, when energized, inhibits its output, a plurality of serially connected blocking oscillators connected to the output of the generator, and a plurality of diodes individually connecting the outputs of the serially connected blocking oscillators to the inhibit terminal of the generator. Each of the serially connected blocking oscillators provides a delay equal to the period of the basic repetition rate of the generator. Logic circuitry is utilized for controlling the condition of operation of the pulse distributing arrangement. One of the principal features of the logic circuitry of the present invention comprises gating arrangements for blocking pulses in at least one of the pulse trains so that a pattern of On-Off pulses may be established. When the invention is used in a PCM system, this pattern of On-Off pulses may comprise the framing information transmitted with the message information. The logic circuitry comprises a counter circuit for counting the pulses occurring on the output of one of the serially connected blocking oscillators, a flip-flop circuit having one of its inputs connected to the output of the counter circuit and its other input connected to the output of one of the serially connected blocking oscillators preceding the one to which the input to the counter circuit is connected, and a normally disabled AND gate having its transmission path connected between the output of the second from last blocking oscillator and the diode connecting that output to the inhibit terminal of the generator and an enabling input connected to the first of two outputs of the flip-flop circuit. This logic circuitry further comprises a second counting circuit connected to the second output of the flip-flop circuit, and a second normally disabled AND gate having a transmission input connected to the output of the last of the serially connected blocking oscillators and two enabling inputs connected, respectively, to the first output of the flip-flop circuit and the output of the second counter circuit.

The present invention, in one of its forms, may be used in a PCM system for periodically delaying the encoding of the message samples for the duration of one time slot and inserting framing information in these slots. By delaying the encoding of the message samples in this manner in order to insert framing information, all of the pulse code groups arriving at the receiver have the same number of digits; that is, degradation does not occur in any of the message channels relative to the others. Furthermore, through the use of the present invention, framing information may be inserted as frequently, or infrequently, as desired in order to insure adequate framing. The maximum percentage of transmitting time is reserved for transmitting the messages by inserting the minimum amount of framing information necessary to insure adequate framing.

The present invention is used in the system disclosed in the above-mentioned Jamison-Wilson application for supplying pulse trains to an encoder for encoding message samples. Each of the encoding pulse trains controls the encoder for a particular time slot in the code groups produced by the encoder. The number of encoding pulse trains is equal, therefore, to the number of time slots in each of the code groups. Multiplexing is achieved by encoding samples of a plurality of messages in a recurrent manner to form a succession of frames, each frame including one encoded sample of each of the messages. When framing information is inserted in the output of the encoder, the encoding pulse trains are each delayed while framing information, supplied by another pulse train from the pulse distributing arrangement, is inserted in the encoder output. In a PCM system containing one embodiment of the invention, the encoding of the message samples is delayed for one time slot during each frame, while the framing information is inserted in the output of the encoder.

In the above-described PCM systems, instantaneous encoders are used; i.e., digits in the encoder outputs occur within the same time slots as the pulses in their respective encoding pulse trains. Encoders sometimes have inherent delay characteristics so that their output digits occur at one or more time slots after the pulses in their respective encoding pulse trains. When an encoder having an inherent delay characteristic is used in the above-described PCM systems, for example, an improper phase relationship occurs between the encoder output digits and the framing digits. The proper phase relationship may be established by passing the framing digits through a delay device before inserting them in the encoder output. A feature of the Jamison-Wilson invention is that framing digits having the proper phase relationship are provided without adding circuitry to the system. This feature takes the form of a connection between the transmission input of the second AND gate and the output of the generator or a blocking oscillator other than the last. The output to which the second AND gate transmission input is connected is determined by the amount of delay introduced by the encoder. If the encoder, for example, introduces a delay of one time slot, the second AND gate transmission input is connected to the output of the generator in order to produce a framing digit pulse train having the proper phase relationship with respect to the encoder output.

The use of the present invention in its broader aspects is not limited to the insertion of framing information between encoded message samples. Other information may be inserted between encoded messages for transmission to a receiver. Furthermore, by continuously time-delaying the output pulse trains, the repetition rates of the pulse trains are reduced to a larger submultiple of the basic repetition rate of the pulse generator output. The present invention is, therefore, capable of producing various submultiples of an input pulse train.

Other objects and features of the invention will be apparent from a study of the following detailed description of several illustrative embodiments. In the drawings.

Figure 1:
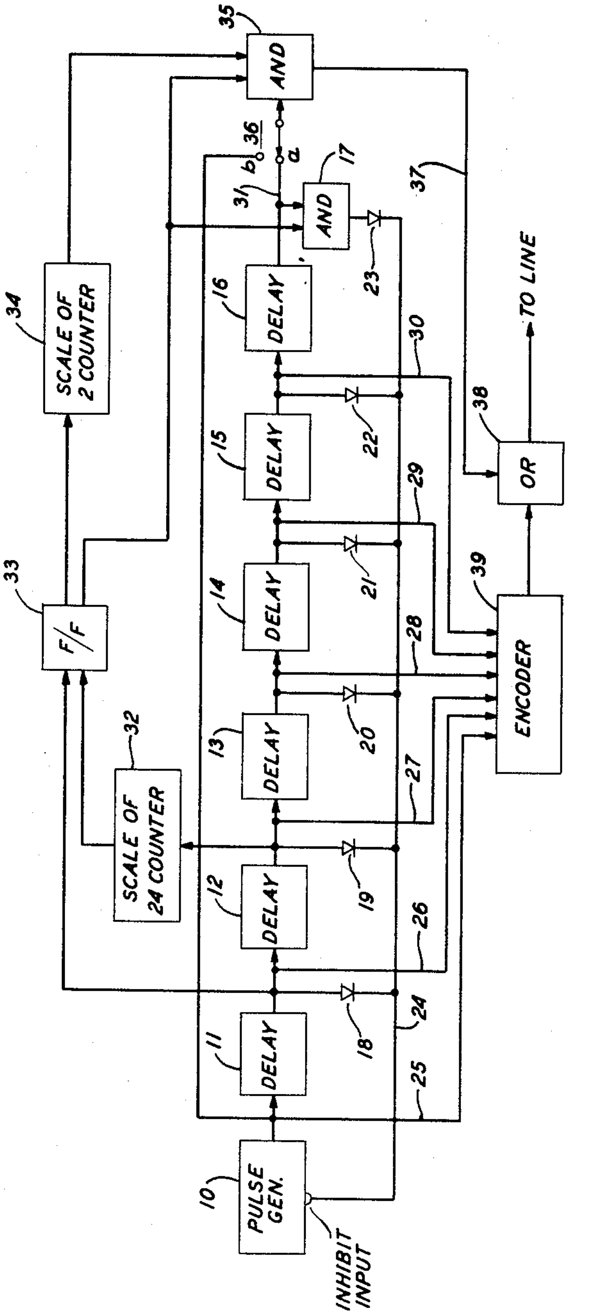
Fig. 1 shows a block diagram of a PCM transmitter containing one embodiment of the invention.

In Fig. 1, a block diagram of a PCM transmitter containing one embodiment of the invention for inserting a framing signal in a PCM pulse pattern is shown. A pulse generator 10 having an inhibit input terminal which, when energized, functions to inhibit output, has its output applied to the first of a plurality of serially connected delay circuits 11 through 16. If the repetition rate of the generator 10 output, in the absence of any inhibiting signals on its inhibit terminal, is considered to be $n$, each of delay circuits 11 through 16 is arranged to produce a time delay equal to $1/n$. Delay circuit 16 has its output connected to the transmission input of a normally disabled AND gate 17. The outputs of the delay circuits 11 through 15 and AND gate 17 are connected by diodes 18 through 23, respectively, to an inhibit bus 24 which, in turn, is connected to the inhibit terminal of generator 10. Leads 25 through 31 are connected to the outputs of generator 10 and delay circuits 11 through 16, respectively.

Delay circuits 11 through 16, in effect, comprise a tapped delay line or phase shifting device. The operation of delay circuits 11 through 16 may be appreciated by both applying a pulse to the input of delay circuit 11 and enabling AND gate 17. When this is done, a series of six pulses is produced on inhibit bus 24. The first of the six pulses occurs at a time interval of $1/n$ after the input pulse, while the remaining five are spaced at successive time intervals of $1/n$.

When generator 10 applies an input pulse to delay circuit 11 and AND gate 17 is enabled, the above-mentioned six pulses are produced on inhibit bus 24. These six pulses inhibit generator 10 so that what would otherwise constitute pulses two through seven in its output do not occur. After the last of the pulses on bus 24 has ceased, generator 10 once again produces a pulse. The above-described action is repeated so that only one out of every seven pulses is permitted to appear on the generator output lead. When operating continuously, generator 10 and delay circuits 11 through 16 each supplies a train of pulses to its respective one of leads 25 through 31. The time interval between the pulses in each of the trains is $7/n$, while the pulse trains are progressively displaced with respect to one another by a time interval $1/n$.

The discussion thus far with respect to Fig. 1 has described a distributor which provides seven different output pulse trains. A feature of this distributor is that when AND gate 17 does not couple the output of delay circuit 16 to inhibit bus 24, only six different pulse trains are produced on leads 25 through 31 as the pulse train produced on lead 31 is identical to the pulse train produced on lead 25. The time interval between the pulses in each of the six different trains is $6/n$, while the pulse trains are still progressively displaced with respect to one another by the time interval $1/n$. In other words, either seven different trains of pulses may be produced in which the pulses in each train occur periodically at time intervals of $7/n$, or six different trains of pulses may be produced in which the pulses in each train occur periodically at time intervals of $6/n$. Furthermore, a time interval of $1/n$ occurs between pulses in any one of the trains and those in the sequentially adjacent train when either six or seven different trains are produced. This may be further appreciated by referring again to Fig. 1. When the output of delay circuit 16 is not coupled to bus 24 by normally disabled AND gate 17, the sixth pulse does not appear on inhibit bus 24. Because five pulses spaced at $1/n$ intervals are now fed into the inhibit terminal of generator 10, only one out of every six pulses is permitted to appear at the output of generator 10. Under this condition of operation, pulses at the output of generator 10 and delay circuit 16 coincide in time. As a result, either lead 25 or 31 and leads 26 through 30 supply six trains of pulses which are progressively displaced with respect to one another by the same time interval of $1/n$.

The normally disabled AND gate 17 shown in Fig. 1 is controlled by an arrangement comprising a conventional flip-flop circuit 33 whose inputs are energized by the outputs of delay circuit 11 and a conventional scale of twenty-four counter 32. Counter circuit 32 is, in turn, energized by the output of delay circuit 12 and produces one output pulse for each twenty-four input pulses. Flip-flop circuit 33 controls, by one of its outputs, the normally disabled AND gate 17 and, by its other output, a scale of two encoder 34. AND gate 17, when enabled, adds an extra inhibit pulse to inhibit bus 24 and, in effect, delays the appearance of timing pulses on leads 25 through 30 by one time slot. The pulses on leads 25 through 30 are applied to an encoder 39 as timing pulses for controlling both the sampling of messages and the encoding of the message samples. The number of encoding digits defining each of the message samples is dependent on encoder 39 and the timing pulse trains applied to encoder 39. The message samples may be defined to a greater or lesser extent by increasing or decreasing, respectively, the number of delay circuits and timing pulse train leads and modifying encoder 39 accordingly. Such techniques are well known to those skilled in the art. When AND gate 17 is enabled, the pulse appearing on leads 25 through 30 are delayed by one time slot so that both the sampling of the messages and the encoding of the message samples are delayed by one time slot.

The output of encoder 34 and the same output of flip-flop circuit 33 which is applied to AND gate 17 are utilized for enabling a second normally disabled AND gate 35. A switch 36 applies either the output of generator 10, when in position $b$, or the output of delay circuit 16, when in position $a$, to the transmission input of AND gate 35. The input applied to AND gate 35 by switch 36 depends upon the inherent delay characteristics of encoder 39 as will become apparent. The output of AND gate 35 is applied by lead 37 to OR gate 38 which is in the output path of encoder 39. AND gate 35, as will be seen, inserts alternate marks and spaces via lead 37 and OR gate 38, in the time slot of the encoder 39 output made available by the delay introduced by enabling AND gate 17. These alternate marks and spaces comprise the framing information transmitted with the PCM signal.

Figure 2:
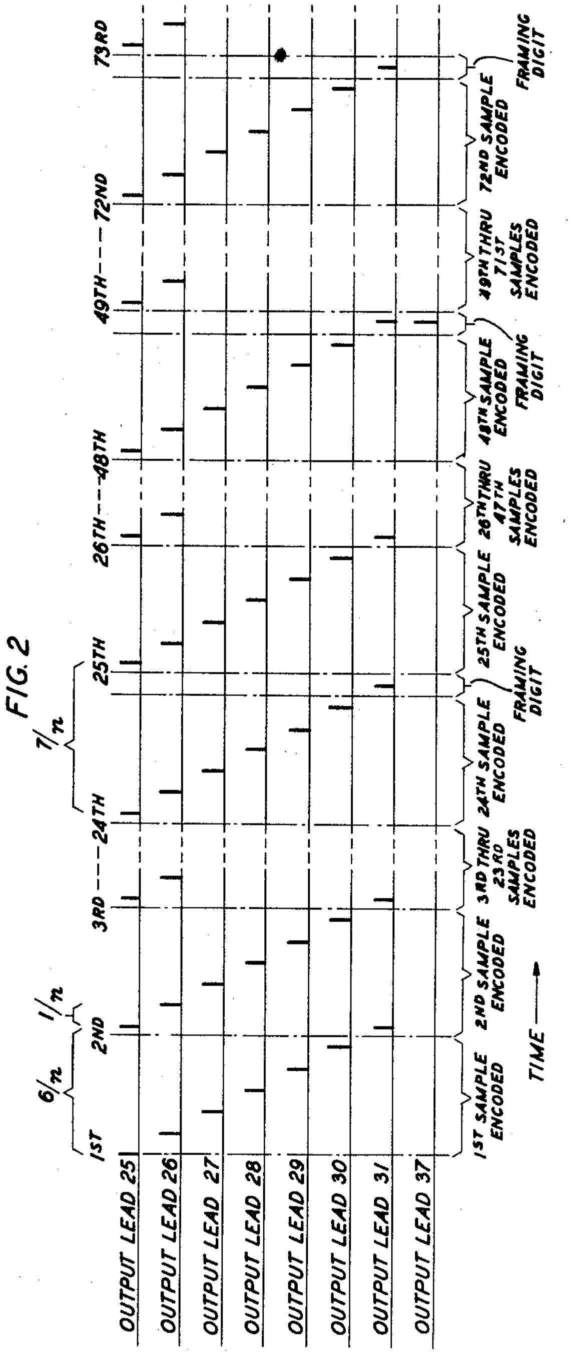
Fig. 2 illustrates the timing of pulses appearing at various points within the embodiment shown in Fig. 1.

The time relationship of the pulses in the pulse trains appearing on leads 25 through 31 and 37, respectively, when AND gate 35 is connected to delay circuit 16 by switch 36 being connected to position $a$, is shown in Fig. 2. The brackets and printed material associated with the time base of Fig. 2 are on the basis that each group of pulses appearing on the leads 25 through 30 as a result of a pulse output from generator 10 (i.e., each set of six pulses shown in substantially vertical array in Fig. 2) is employed to encode one message sample. If desired as an alternative, all of the pulses in a group may be utilized for partially encoding in a sequential manner samples from each of the signals to be encoded. Both techniques are well known in the art.

The time relationship of the pulses shown in Fig. 2 may be better understood by considering in more detail the operation of the embodiment of the invention shown in Fig. 1. The scale of twenty-four counter circuit 32 produces an output once for every twenty-four input pulses, while the scale of two counter circuit 34 produces an output once for every two occurrences of positive input voltages. Pulses applied to flip-flop circuit 33 from delay circuit 11 either shift the former to the state supplying no enabling voltage to AND gates 17 and 35 or retain it in that state if it is there already. When AND gates 17 and 35 do not receive an enabling voltage from flip-flop circuit 33, pulses from delay circuit 16 are blocked from inhibit bus 24 and lead 37. Under these conditions, the pulses on leads 25 and 31 coincide in time. Flip-flop circuit 33 is maintained in this state until the twenty-fourth pulse produced by generator 10 appears at the output of delay circuit 12. When counter circuit 32 has counted twenty-four input pulses, it produces an output which causes flip-flop circuit 33 to change state and apply enabling voltages to AND gates 17 and 35. Counter circuit 34, which is arranged to count by two's, registers the occurrence of one positive input voltage but does not itself provide an enabling voltage to AND gate 35, so that AND gate 35 remains disabled. Under these conditions, the pulse at the output of delay circuit 16, as a result of the twenty-fourth pulse from generator 10, passes through diode 23 to inhibit bus 24. The output from delay circuit 16 causes the twenty-fifth pulse produced by generator 10 to be delayed for one time slot. Because AND gate 35 is disabled, the output from delay circuit 16 is not applied to OR gate 38 and a framing digit comprising a space is inserted in the encoded groups. This is illustrated in Fig. 2 above the label "framing digit" adjacent to the label "24th sample encoded."

The pulse produced at the output of delay circuit 11 as a result of the twenty-fifth pulse from generator 10 causes flip-flop circuit 33 to change back to its initial state. When this occurs, AND gate 17 is once again disabled. Delay circuit 16 is, in effect, disconnected from inhibit bus 24 until a pulse occurs at the output of delay circuit 12 as a result of the forty-eighth pulse from generator 10. Counter circuit 32, which has again counted twenty-four input pulses, produces an output which causes flip-flop circuit 33 to change state. Once again an enabling voltage is applied to AND gates 17 and 35 and counter circuit 34 registers another occurrence of a positive input voltage. Counter circuit 34 (which counts by two's) applies another enabling voltage to AND gate 35, whereby AND gate 35 passes signals appearing on lead 31 to lead 37. When a pulse occurs at the output of delay circuit 16 as a result of the forty-eighth pulse from generator 10, a pulse is coupled both to pulse generator 10 and OR gate 35. Generator 10 is inhibited in the normal fashion for a time interval of $1/n$ but, since AND gate 35 is enabled, a framing digit comprising a pulse is inserted in the encoder output by OR gate 38. This is illustrated in Fig. 2 above the label "framing digit" adjacent to the label "48th sample encoded." The pulse produced at the output of delay circuit 11 as a result of the forty-ninth pulse from generator 10 completes the cycle as flip-flop circuit 33 resumes its initial condition and AND gates 17 and 35 resume their normally disabled conditions.

The above-described arrangement, in effect, periodically delays the encoding of message signals for a duration of one time slot and alternately inserts a pulse and space in these slots in order to provide framing information. Although the arrangement described provides an extra framing interval after every one hundred and forty-four encoding time slots and alternately supplies these slots with pulses, various combinations of framing information may be provided by modifying the counting circuits 32 and 34. A pattern of framing information may be established, for example, so that an extra pulse interval is added after every seventy-two encoding pulses, with every fourth interval containing a pulse, by arranging counting circuits 32 and 34 to count by twelve and four, respectively.

As shown in Fig. 2, pulses occur simultaneously on leads 25 and 31 when AND gate 17 is in its normally disabled condition. Furthermore, when AND gate 17 is enabled, pulses appear on leads 25 and 31 in a sequential manner. This feature of the invention establishes a symmetry in the pulse trains appearing on leads 25 through 31 which permits the pulse train on either of leads 25 or 31 to be used for producing framing information while the remaining train is used for encoding. As shown in Fig. 2, leads 25 through 30 supply encoding pulse trains while lead 31 supplies a pulse train for producing the framing information. In accordance with this symmetrical feature, the pulses on leads 26 through 31 may be utilized for encoding message samples and the pulses on lead 25 may be utilized for producing the framing information. In particular, lead 25 may be connected to the transmission input of AND gate 35 instead of encoder 39 and lead 31 may be connected to encoder 39 instead of AND gate 35. When connected in this manner, the digits in each of the encoded samples are sequentially produced as a result of the pulses appearing on leads 26 through 31, respectively, instead of the pulses appearing on leads 25 through 30, respectively, as shown in Fig. 2.

The above discussion with respect to Fig. 1 is predicated on encoder 39 producing an instantaneous output; i.e., digits in the encoder output occur within the same time slots as the pulses in their respective encoding pulse trains. Encoders sometimes have inherent delay characteristics so that their output digits occur at one or more time slots after the pulses in their respective encoding pulse trains. When an encoder having an inherent delay characteristic is used as encoder 39 in the embodiment shown in Fig. 1, the proper phase relationship between the encoder output digits and the framing digits may be established by passing the framing digits through a delay device before inserting them in OR gate 38. In accordance with one feature of the PCM system of Fig. 1, delayed framing digits may be provided without adding circuitry to the system by connecting the transmission input of AND gate 35 to the output of generator 10 or a delay circuit other than delay circuit 16. The output to which the transmission input of AND gate 35 is connected is dependent on the delay introduced by encoder 39. If encoder 39 provides a delay equal to one time slot, for example, properly phased framing digits may be applied to OR gate 38 by moving switch 36 to position *b* so that the output from generator 10 is applied to the transmission input of AND gate 35.

Figure 3:
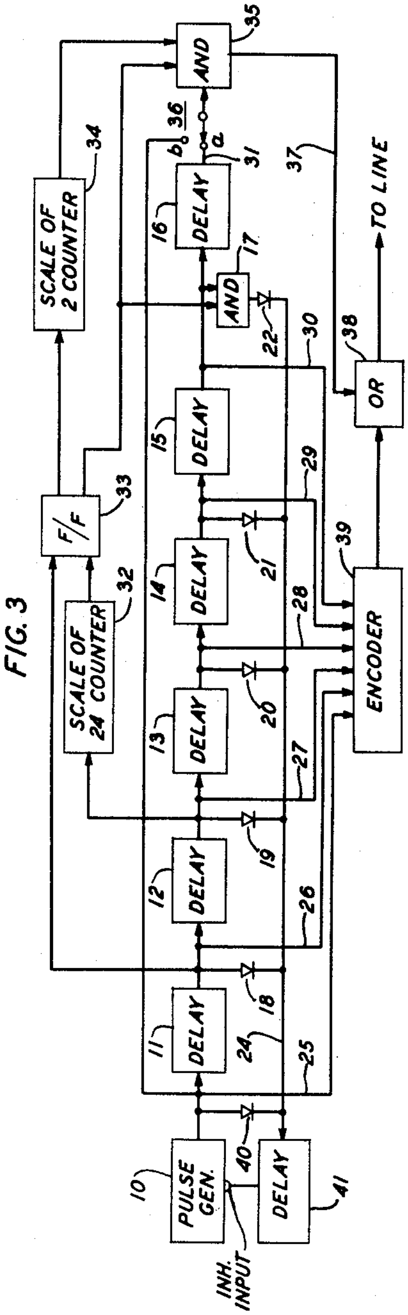
Fig. 3 shows a block diagram of a PCM transmitter containing another embodiment of the invention.

A block diagram of a PCM transmitter containing another embodiment of the invention for inserting a framing signal in a multichannel PCM pulse pattern is shown in Fig. 3. This arrangement feeds back inhibiting pulses to generator 10 in a different manner than that shown in Fig. 1. In the embodiment of Fig. 3, the output from delay circuit 16 is never applied to bus 24, while the output from delay circuit 15 is applied to bus 24 only when AND gate 17 is enabled. Furthermore, the output from generator 10 is applied to bus 24 by a diode 40, and a delay circuit 41 providing a delay equal to one time slot is connected between bus 24 and the inhibiting terminal of generator 10. When AND gate 17 is in its normally disabled condition, a pulse from generator 10 produces a series of five pulses on bus 24, the first of which appears substantially simultaneously with the output pulse of generator 10, while the remaining four pulses occur at $1/n$ intervals. The five pulses on bus 24 are delayed by an interval $1/n$ in delay circuit 41 so that what would normally constitute output pulses two through six of generator 10 do not occur. When AND gate 17 is enabled, six pulses appear on bus 24 which, in turn, are applied to the inhibit terminal of generator 10 to inhibit what would otherwise comprise output pulses two through seven of generator 10.

The time relationships of the pulses in the pulse trains appearing on leads 25 through 31 and 37 in the embodiments of Figs. 1 and 3 are identical. Therefore, Fig. 2 applies to the embodiment of Fig. 3 as well as to the embodiment of Fig. 1.

Because the time relationships of the pulse trains in both embodiments are identical, the pulse symmetrical feature discussed with respect to Fig. 1 is also present in the embodiment of Fig. 3. The functions of the pulse trains appearing on leads 25 and 31 may be interchanged by effecting the same connection modifications discussed with respect to Fig. 1.

If encoder 39 of Fig. 3 is not of the instantaneous type, the correct phase relationship between the encoder output and the framing digits on lead 37 may be effected in a manner identical to that discussed with respect to Fig. 1. In particular, if encoder 39 has an inherent delay of one time slot, switch 36 may be moved to position *b* so that the transmission input of AND gate 35 is connected to the output of generator 10. Under the latter conditions, delay device 16 may be eliminated as its output does not serve any purpose.

Pulse generators sometimes have inherent delay characteristics. A particular feature of the embodiment of Fig. 3 is that a pulse generator having an inherent delay of one time slot may be used in place of generator 10 and delay circuit 41.

In order to simplify the description, the PCM systems of Figs. 1 and 3 are shown as periodically delaying the encoding of the message samples for only one time slot and inserting framing digits in the empty time slots appearing in the encoder output. In some systems, voice communication for example, the framing digit pattern inserted by either of these embodiments is adequate for the receiver terminal to restore framing after it has been interrupted before the users realize the interruption. Some applications of PCM multiplexing require a more rapid restoration of interrupted framing. The present invention, in one of its forms, delays the encoding of message samples in a PCM transmitter for several time slots when framing is interrupted and inserts a particular digit pattern in the empty time slots appearing in the encoder output. The receiving terminal readily recognizes this particular digit pattern and rapidly effects framing. Additional empty time slots appear in the output of encoder 39 of Figs. 1 and 3, for example, when one or more delay circuits are connected in series with the illustrated delay circuits and the outputs of the added delay circuits are coupled to inhibitor bus 24 by appropriate AND gates and diodes. A framing digit pattern may be inserted in these additional empty time slots by coupling, by appropriate AND gates, the outputs of the added delay circuits to the input of OR gate 38.

Figure 4:
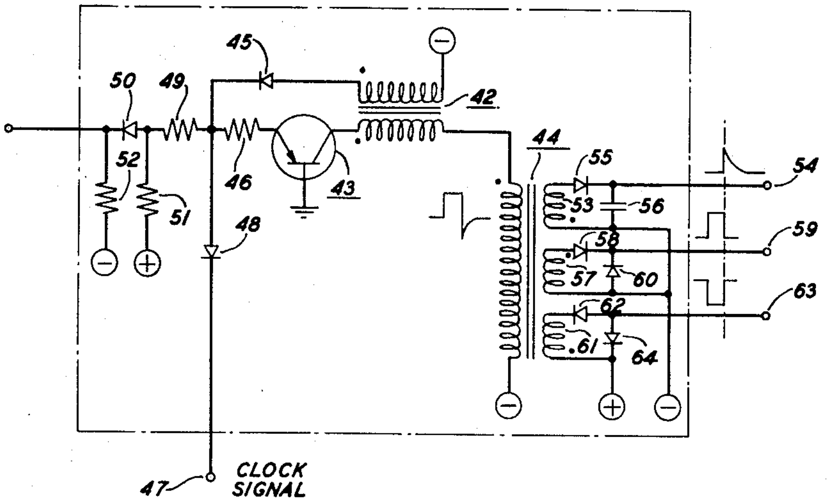
Fig. 4 shows a schematic diagram of one specific delay circuit which may be used in practicing the invention.

One form which the various delay circuits in the embodiments of the invention shown in Figs. 1 and 3 may take is a transistor blocking oscillator illustrated in Fig. 4. With the exception of the output circuits, this blocking oscillator is similar to one disclosed in patent application Serial No. 574,865, filed March 29, 1956, by L. C. Thomas. The primary winding of a transformer 42 is connected between the collector electrode of a transistor 43, which has a large current signal gain, and one extremity of a primary winding of a transformer 44. The remaining extremity of the primary winding of transformer 44 is connected to ground through a negative source. One extremity of the secondary winding of transformer 42 is also connected to ground through a negative source. The remaining extremity of the secondary winding of transformer 42 is connected to the emitter electrode of transistor 43 by a series combination comprising a diode 45 and a resistor 46. The series combination is arranged so that the direction of easy current flow in diode 45 is away from transformer 42 and resistor 46 is connected to the emitter electrode. A sinusoidal clock signal input terminal 47 is connected to the junction of the series combination comprising diode 45 and resistor 46 by a diode 48 which is poled so that the direction of easy current flow is toward terminal 47.

A decoupling resistor 49 is connected between the junction of a series combination comprising diode 45 and resistor 46 and the output terminal of a diode enabling circuit. The diode enabling circuit comprises a diode 50 connected in series between a pair of resistors 51 and 52 which have their remaining extremities connected to positive and negative sources, respectively. The diode 50 is poled in a forward bias sense with its cathode and anode electrodes comprising the input and output terminals, respectively, of the diode enabling circuit. The base electrode of transistor 43 is connected to ground.

When no signal is applied to the input of the diode enabling circuit of Fig. 4, a small current flows through resistor 51, the forward biased diode 50 and resistor 52. The effect of this current flow is to provide a cut-off bias on the emitter electrode of transistor 43 so that it is normally nonconducting. When a positive signal is applied to the input of the diode enabling circuit, the diode 50 becomes back biased thereby removing the emitter cut-off bias produced by the enabling circuit. When the sinusoidal clock signal applied to the terminal 47 is negative in nature, a current flow occurs through resistors 51 and 49 and diode 48 to produce a cut-off bias on the emitter electrode of transistor 43. In the present application of this blocking oscillator circuit, the duration of the input signal is approximately one-half of the period of the repetition rate of generator 10. An interval approximately equal to one-quarter of the period of the repetition rate of generator 10 is permitted to elapse after the input signal is applied to the diode enabling circuit before the sinusoidal clock signal, which has a frequency equal to the repetition rate of the generator, reaches a potential sufficient to back bias diode 48. The input signal is still applied to the diode enabling circuit, therefore, when diode 48 becomes reverse biased. As no cut-off bias now exists on the emitter electrode, an emitter-to-base current begins to flow which, in turn, causes a rapid increase in the base-to-collector current. The increase in the base-to-collector current induces a voltage in the secondary winding of transformer 42 which forward biases diode 45 and increases the emitter-to-base current. Regeneration thus takes place and the transistor is rapidly driven to voltage saturation. When the sinusoidal clock signal again forward biases diode 48, a short circuiting path parallel to the emitter-base circuit of transistor 43 is provided which diverts the current from diode 45 to the short circuiting path. Cutting off the emitter current causes transistor 43 to be driven out of its voltage saturation condition to its cut-off condition.

The leading edge of the pulse appearing across the primary winding of transformer 44 in response to an input pulse is delayed with respect to the leading edge of the input pulse by substantially 90 degrees because of the holding-off action created by the clock signal. The general shape of the output pulse, which contains a negative overshoot, is shown in Fig. 4 alongside the primary winding of transformer 44.

Fig. 3 shows a single output for each of the delay circuits. Although a general treatment of this nature may be adequate for block diagram purposes, several output signals of particular shapes and polarities may be necessary to control the various circuits connected to the outputs of the delay circuits. In the circuit illustrated in Fig. 4, three secondary windings and associated circuitry are provided for transformer 44 in order to provide output signals of the desired shapes and polarities. These output circuits will now be discussed in more detail.

A secondary winding 53 of transformer 44 has one extremity connected to a negative source, while the remaining extremity is connected to an output terminal 54 by a diode 55 which is poled for easy current flow toward terminal 54. A capacitor 56 is connected between terminal 54 and the last-mentioned negative source. Winding 53 is connected in a reverse sense with respect to the primary winding of transformer 44 so that the positive pulse with the negative overshoot on the primary winding appears across a secondary winding 53 as a negative pulse with a positive overshoot. Diode 55 is poled to pass only the positive overshoot so that a decaying waveform appears at terminal 54 which is stretched, when compared to the positive overshoot across winding 53, by virtue of capacitor 56.

When a chain of blocking oscillators like the one shown in Fig. 4 is used as the succession of delay circuits in an embodiment of the present invention, the waveform appearing at each terminal 54 is applied to the next succeeding blocking oscillator as an input signal. Because the leading edge of the waveform at terminal 54 occurs after the clock signal has again forward biased diode 48, the diode 48 in the succeeding stage is also forward biased as the same clock signal is applied to all stages. The succeeding stage completes a cycle similar to that described above when the clock signal becomes sufficiently positive to reverse bias the diode 48 in that stage. In this manner, the positive pulses appearing across the primary winding of transformer 44 in all delay stages are controlled by both the clock signal and the output of the previous stage. As the frequency of the clock signal is equal to the repetition rate of generator 10, a positive pulse appears across the primary winding of transformer 44 in succeeding stages displaced by the period of the repetition rate of the clock signal.

Input pulses of the proper shape and polarity for encoder 37, flip-flop circuit 33, bus 24, counter circuit 32 and AND gate 17 are provided by a secondary winding 57 and its associated circuitry. One extremity of winding 57 is connected through a diode 58 to an output terminal 59, while the other extremity is connected to the last-mentioned negative source. Winding 57 is oppositely poled with respect to winding 53 and diode 58 is poled for easy current flow toward output terminal 59. Another diode 60 is connected between the last-mentioned negative source and terminal 59 and poled so that the direction of easy current flow is toward terminal 59. This arrangement of diodes removes the negative overshoot of the waveform coupled into the winding 57 so that a positive pulse appears at the terminal 59, as illustrated in Fig. 4. The leading edge of this pulse is coincident with the leading edge of the waveform appearing across the primary winding of transformer 57.

In order to provide the proper type of output from delay circuit 39 to inhibit generator 10, a third secondary winding 61 and associated circuitry is provided. Winding 61 is connected in a reverse sense to winding 57. A diode 62 is connected between one extremity of winding 61 and an output terminal 63 so that the direction of easy current flow is away from terminal 63. The other extremity of winding 61 is connected to a positive source. Another diode 64 is connected between terminal 63 and the positive source so that the direction of easy current flow is away from terminal 63. By this arrangement of diodes, the positive overshoot of the inverted primary signal appearing across winding 61 is blocked and only the negative pulse is permitted to pass to the output terminal 63.

Figure 5:
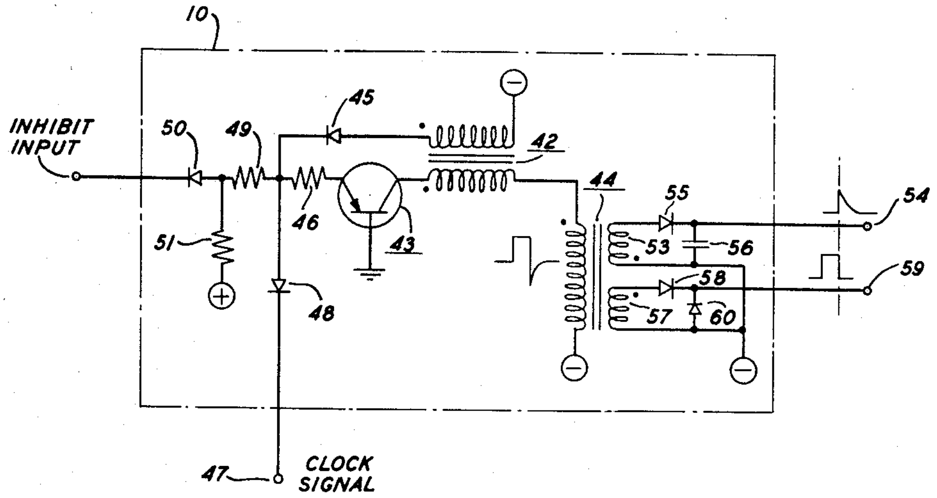
Fig. 5 shows a schematic diagram of one specific pulse generator that may be used in practicing the invention.

One form which pulse generator 10 and delay circuit 41 in the embodiment of the invention shown in Fig. 3 may take is the transistor blocking oscillator illustrated in Fig. 5. This particular oscillator has an inherent delay of one time slot which eliminates the necessity of separate delay circuit 41. The arrangement is similar to that shown in Fig. 4, with the exception that secondary winding 61 and its associated components, and resistor 52 and the negative source to which it is connected have been omitted. Omitting resistor 52 and its associated negative supply transforms the input circuit from a diode enabling circuit to an inhibitor circuit. When a negative signal appears on the inhibit input of the circuit of Fig. 5, current which would normally flow into the emitter electrode of transistor 43 is caused to flow into the now forward biased diode 50 so that regeneration cannot take place in the blocking oscillator circuit. In the absence of an inhibit input signal, current begins to flow into the emitter electrode of transistor 53 when the clock signal applied to terminal 47 back biases diode 48, and a regeneration process takes place identical with that described in connection with Fig. 4. When the circuit of Fig. 5 is used in the present invention, the clock signal applied to terminal 47 of that circuit must lag the clock signal applied to terminal 47 of the circuit of Fig. 4 by 90 degrees so that a proper phase relationship is maintained between the various outputs of the components of the system.

The invention has been described only with respect to certain specific embodiments. It is to be understood that various other embodiments may be devised by those skilled in the art without departing from the spirit and scope of the invention.

What is claimed is:

1. In combination, a pulse generator for supplying pulses at an output terminal at a basic repetition rate $n$ and having an inhibit terminal which when energized inhibits the output of said pulse generator, phase shifting means including $k$ serially connected delay circuits each having input and output terminals and providing a delay substantially equal to $1/n$, a transmission path between said pulse generator output terminal and the input terminal of the first of said serially connected delay circuits, means connecting the output terminal of each of the first $(k-1)$ of said delay circuits to said inhibit terminal, a counting circuit having an input terminal and an output terminal, means connecting said counting circuit input terminal to the output terminal of one of said delay circuits preceding the $k$th of said serially connected delay circuits, a normally disabled AND gate having an enabling input terminal and a transmission path, means connecting said AND gate transmission path between the output of the $k$th of said delay circuits and said inhibit terminal, and means connecting said AND gate enabling input terminal to said counting circuit output terminal.

2. In combination, a pulse generator for supplying pulses at an output terminal at a basic repetition rate and having an inhibit input terminal which when energized disables said pulse generator, phase shifting means including $k$ serially connected delay circuits each having input and output terminals and providing a delay substantially equal to the period of said basic repetition rate, a transmission path between said pulse generator output terminal and the input of the first of said delay circuits, means connecting the output terminal of each of the first $(k-1)$ of said delay circuits to said inhibit input terminal, and logic means responsive to at least one of the first $(k-1)$ delay circuits for periodically connecting the output terminal of the $k$th of said delay circuits to said inhibit input terminal.

3. A pulse distributing arrangement comprising a pulse generator for supplying pulses at an output terminal at a basic repetition rate $n$, phase shifting means having an input terminal and $k$ output terminals for providing outputs at delay intervals substantially equal to $1/n$, $2/n$, . . . $k/n$, respectively, means providing a transmission path between said generator output terminal and said phase shifting means input terminal, inhibitor means responsive to the first $m$ of said phase shifting means outputs, where $m$ is less than $k$ by at least one, for preventing said generator from supplying pulses to said phase shifting means, and logic means responsive to at least one of said phase shifting means output terminals for periodically applying the remainder of said phase shifting means outputs to said inhibitor means.

4. In combination, a pulse generator for supplying pulses at an output terminal at a basic repetition rate $n$ and having an inhibit input terminal which when energized inhibits the output of said pulse generator, phase shifting means including $k$ serially connected delay circuits each having input and output terminals and providing a delay substantially equal to $1/n$, a transmission path between said pulse generator output terminal and the input terminal of the first of said serially connected delay circuits, a $(k+1)$th delay circuit having input and output terminals and providing a delay substantially equal to $1/n$, means connecting the output terminals of said pulse generator and each of the first $(k-2)$ of said delay circuits to said $(k+1)$th delay circuit input terminal, means connecting said $(k+1)$th delay circuit output terminal to said generator inhibit terminal, a counting circuit having an input terminal and an output terminal, means connecting said counting circuit input terminal to the output terminal of one of said delay circuits preceding the $k$th of said serially connected delay circuits, a normally disabled AND gate having a transmission input terminal, an enabling input terminal and an output terminal, means connecting said AND gate output terminal to said $(k+1)$th delay circuit input terminal, means connecting said AND gate enabling input terminal to said counting circuit output terminal, and means connecting said AND gate transmission input terminal to said $(k-1)$th delay circuit output terminal.

5. In combination, a pulse generator for supplying pulses at an output terminal at a basic repetition rate and having an inhibit input terminal which when energized inhibits its output, phase shifting means including $k$ serially connected delay circuits each having input and output terminals and providing a delay substantially equal to $1/n$, means providing a transmission path between said pulse generator output terminal and the input terminal of the first of said serially connected delay circuits, a $(k+1)$th delay circuit having input and output terminals and providing a delay substantially equal to $1/n$, means connecting the output terminals of said pulse generator and each of the first $(k-2)$ of said delay circuits to said $(k+1)$th delay circuit input terminal, means connecting said $(k+1)$th delay circuit output terminal to said generator inhibit terminal, and logic means including a counting circuit connected to at least one of said $k$ delay circuit output terminals for periodically applying the output on the $(k-1)$th of said delay circuits to said $(k+1)$th delay circuit input terminal.

6. A pulse distributing arrangement comprising a pulse generator for supplying pulses at an output terminal at a basic repetition rate $n$, phase shifting means having an input terminal and $k$ output terminals for providing outputs at delay intervals substantially equal to $1/n$, $2/n$, . . . $k/n$, respectively, means providing a transmission path between said generator output terminal and said phase shifting means input terminal, inhibitor means including a delay circuit providing a delay substantially equal to $1/n$ and having input and output terminals, means connecting the first $m$ of said output terminals of said phase shifting means, where $m$ is less than $(k-1)$ by at least one, and said generator output terminal to said inhibitor means input terminal, means connecting said inhibitor means output terminal to said generator for preventing said generator from supplying pulses to said phase shifting means, and logic means including a first counting circuit and responsive to at least one of said phase shifting means output terminals for periodically applying the remainder of said phase shifting means outputs, except for the $k$th of said outputs, to said inhibitor means.

7. A pulse distributing arrangement comprising a pulse generator for supplying pulses at an output terminal at a basic repetition rate $n$ and having an inhibit terminal which when energized inhibits the output of said pulse generator, phase shifting means having an input terminal and $k$ output terminals for providing outputs at delay intervals substantially equal to $1/n$, $2/n$, . . . $k/n$, respectively, means providing a transmission path between said generator output terminal and said phase shifting means input terminal, leads making available said generator output terminal and each of said phase shifting means output terminals, means connecting $m$ of said leads, where $m$ is less than $k$ by at least one, to said inhibitor means, and logic means for applying the outputs on all but one of the remainder of said leads to said inhibit input terminal.

8. A pulse distributing arrangement comprising a pulse generator for supplying pulses at an output terminal at a basic repetition rate $n$, phase shifting means having an input terminal and $k$ output terminals for providing outputs at delay intervals substantially equal to $1/n$, $2/n$, . . . $k/n$, respectively, means providing a transmission path between said generator output terminal and said phase shifting means input terminal, inhibitor means for preventing said generator from supplying pulses to said phase shifting means, leads making available said generator output terminal and each of said phase shifting means output terminals, means connecting $m$ of said leads, where $m$ is less than $k$ by at least one, to said inhibitor means, and controllable means for applying the outputs on all but one of the remainder of said leads to said inhibitor means.

References Cited in the file of this patent

UNITED STATES PATENTS

| | | |
|---|---|---|
| 2,548,661 | Feldam | Apr. 10, 1951 |
| 2,567,944 | Krause | Sept. 18, 1951 |
| 2,620,440 | Baker | Dec. 2, 1952 |
| 2,649,502 | Odell | Aug. 18, 1953 |
| 2,795,775 | Faymoreau | June 11, 1957 |